(12) United States Patent
Clausen et al.

(10) Patent No.: US 7,058,314 B1
(45) Date of Patent: *Jun. 6, 2006

(54) METHOD AND SYSTEM FOR REDUCING INTRA-CHANNEL NONLINEAR EFFECTS IN HIGHLY DISPERSED OPTICAL PULSE TRANSMISSION

(75) Inventors: Carl Balslev Clausen, Red Bank, NJ (US); Antonio Mecozzi, Rome (IT); Mark Shtaif, Fort Lee, NJ (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/930,075

(22) Filed: Aug. 31, 2004

Related U.S. Application Data (63) Continuation of application No. 09/795,629, filed on Feb. 28, 2001, now Pat. No. 6,832,050.

(60) Provisional application No. 60/267,724, filed on Feb. 12, 2001, provisional application No. 60/219,355, filed on Jul. 19, 2000.

(51) Int. Cl.
  *H04B 10/08* (2006.01)
  *H04B 10/12* (2006.01)
  *H04B 10/04* (2006.01)
  *H04J 14/02* (2006.01)

(52) U.S. Cl. ............... 398/193; 398/25; 398/29; 398/81; 398/147; 398/148; 398/199

(58) Field of Classification Search .......... 398/25, 398/28, 29, 81, 147, 148, 159, 193, 199, 398/208

See application file for complete search history.

(56) References Cited

U.S. PATENT DOCUMENTS

| 5,870,213 A * | 2/1999 | Ishikawa et al. .......... 398/98 |
| 6,320,687 B1 * | 11/2001 | Ishikawa .................. 398/147 |
| 6,832,050 B1 * | 12/2004 | Clausen et al. ............ 398/147 |
| 2003/0194242 A1 * | 10/2003 | Miyauchi et al. .......... 398/193 |

* cited by examiner

*Primary Examiner*—Leslie Pascal
*Assistant Examiner*—Dalzid Singh

(57) ABSTRACT

A system and method for reducing timing and amplitude jitter in trnasmission of Retrun-to-Zero modulated pulses is described. In the reduction of amplitude jitter the modulated pulses must be phase coherent. The method comprises the steps of measuring a total dispersion of a transmission fiber link, computing an optimal amount of pre-chirp to be added at an input of said transmission fiber link, computing an optimal amount of pre-chirp to be added at an output of said transmission fiber link, adding said optimal amount of pre-chirp to said input of said tranmisssion fiber link and adding said optimal amount of pre-chirp to said output of said tranmisssion fiber link. The system for reducing timing jitter in transmission of Return-to-Zero modulated pulses comprises means for measuring a total dispersion of a transmission fiber link, means for computing an optimal amount of pre-chirp to be added at an input of said transmission fiber link, means for computing an optimal amount of pre-chirp to be added at an output of said transmission fiber link, means for adding said optimal amount of pre-chirp to said input of said transmission fiber link and means for adding said optimal amount of pre-chirp to said output of said transmission fiber link.

6 Claims, 6 Drawing Sheets

METHOD AND SYSTEM FOR REDUCING INTRA-CHANNEL NONLINEAR EFFECTS IN HIGHLY DISPERSED OPTICAL PULSE TRANSMISSION

This non-provisional application is a continuation and claims the benefit of U.S. application Ser. No. 09/795,629, filed Feb. 28, 2001, now U.S. Pat. No. 6,832,050 which claims the benefit of Provisional Appl. Ser. No. 60/219,355, filed Jul. 19, 2000 and Provisional Appl. Ser. No. 60/267,724, filed Feb. 12, 2001.

FIELD OF THE INVENTION

The present invention relates to the field of optical communications systems and particularly to a method for reduction or elimination of timing jitter and amplitude jitter occurring in transmission of Return-to-Zero (RZ) modulated pulses by use of optimum amount of pre-chirp.

BACKGROUND OF THE INVENTION

Transmission of optical pulses based on RZ modulation is emerging as the best choice in high bit rate and/or long distance systems. However, the pulses suffer from nonlinear intra-channel effects, which lead to timing jitter and amplitude jitter. Timimg jitter and amplitude jitter weaken the performance and limit the maximum capacity of each channel.

SUMMARY OF THE INVENTION

Dispersion describes how a signal is distorted due to the various frequency components of the signal having different propagation characteristics. Specifically, dispersion is the degree of scattering in the light beam as it travels along a fiber span. Dispersion can also be caused by the frequency dependence of the group velocity of a light signal propagating inside a fiber.

The intricate interplay of nonlinearity and dispersion acting on pulses in optical fibers continues to challenge the conventional wisdom and established intuition. One example is the idea that short duty-cycle RZ transmission in dispersive fibers is able to combat the detrimental effects of fiber nonlinearity. Due to their short width, the pulses disperse rapidly, spreading in time over hundreds or thousands of bits. Theory, simulations and experiments in the prior art uniformly show that with shorter pulses the non-linear impairments are reduced. This may seem somewhat counter-intuitive since the reduction of the pulse width is inevitably accompanied by an increase in the pulse peak power and an increase in the impact of self-phase modulation (SPM) may be expected. SPM causes compression in the pulse. The reason for the reduction is not merely that the individual peak power is reduced by dispersion. In a random bit sequence the intensity pattern of the interfering pulses contains spikes that are of the same order of magnitude as the input peak power. The reduced peak power is, therefore, not a viable explanation. Rather, the mechanism for the tolerance towards nonlinear impairments relies on the fact that the intensity pattern changes very rapidly. Thus, the accumulated effect of the instantaneous nonlinearity tends to get averaged out and SPM and nonlinear pulse interaction is reduced even though the pulses spread over hundreds of neighboring time slots. The concept of spreading the pulses as far as possible and as quickly as possible in the time domain, creating a rapidly varying intensity pattern, in order to combat the impact of nonlinearity, represent such a big shift from standard dispersion managed approaches that a specific term "tedon-transmission" has been coined to represent this scheme.

System penalties are generated in the form of timing and amplitude jitter, which limit the performance of such systems. It may be useful to note that the scheme presented herein is fundamentally different from schemes, which rely on soliton transmission where the pulses usually do not spread over more than tens of bits.

Analysis of the nonlinear pulse interaction in systems based on highly dispersed optical pulses provides estimates of timing and amplitude jitter. The pulse streams are both coherent and non-coherent. Analysis of the nonlinear intra-channel effects indicate that the non-linear effects possess a symmetry when pre-chirped pulses are launched. System penalties reduce montonically with decreasing pulse width and with increasing fiber dispersion. Proper dispersion pre-compensation can result in a significant reduction of the nonlinear impairments. Optimal pre-compensation can be determined analytically.

It is, therefore, an object of the present invention to minimize timing jitter by injecting the proper amount of pre-chirp into the communications link.

A further object of the present invention is to minimize amplitude jitter by injecting the proper amount of pre-chirp into the communications link.

BRIEF DESCRIPTION OF THE DRAWINGS

The invention is best described with reference to the detailed description and the following figures, where.

DETAILED DESCRIPTION OF THE PREFERRED EMBODIMENTS

The present invention concentrates on timing and amplitude jitter as well as the energy of pulses generated in time slots corresponding to logical zeroes. Analytical estimates of timing and amplitude jitter in systems based on highly dispersed optical pulses can be obtained. System penalties reduce monotonically with decreasing pulse width and with increasing chromatic dispersion. There is a qualitative difference between the phase coherent case, when there is a fixed relationship with the pulse stream, and the incoherent case, where the phase relation between pulses is random. The two cases are equivalent in terms of the timing jitter but differ significantly in terms of the amplitude jitter and the noise of the zeroes. In the coherent case there is a larger noise on zeroes but the amplitude jitter can be minimized by quasi-symmetric dispersion compensation. In the incoherent case, the noise on zeroes is lower but no improvement in the amplitude jitter can be obtained by manipulating the dispersion compensation scheme.

In the case of RZ modulation with Gaussian shaped pulses propagating in a sequence of lossy, dispersive fiber spans with periodic amplification and further assuming highly dispesive pulses for 40 Gbits/s over 800 km conventional single mode fiber, where the dispersion compensation is applied at the receiver as opposed to span by span the expressions for timing and amplitude jitter can be derived. The derivations of the expressions for the timing and amplitude jitter rely only on the assumptions that are inherent to the perturbational approach. Assuming a random sequence of Gaussian shaped pulses at the system input $$\sum_{n=-\infty}^{\infty} m_n u_n(0, t),$$

where $m_n$ is equal to 0 or 1 with probability of 0.5, and where $u_n(0,t) = A_0 \exp(-0.5(t-nT)^2/\tau^2)$ with $T=1/B$, B being the data rate and averaging over all possible two-pulse interactions yields the following result:

$$std(t_1)B = C_1 \gamma P_{av} \tau^{3/2} \sqrt{B/|B_2|} \quad (1)$$

where $std(t_1)$ denotes the standard deviation of the temporal pulse position, defined as the position of the center of mass of the pulse $t_1 = (1/E_1)\int t|u_n(L,t)|^2 dt$, $E_1 = \sqrt{\pi} A_0^2 \tau$ is the energy of the pulses, $P_{av} = E_1 B/2$ is the average power of the signal, $\gamma$ is the nonlinearity coefficient, $\tau$ is the full width at half maximum of the pulse and $B_2$ is the dispersion coefficient. Because of the linearization approximation, and of the large number of pulses interacting with any given one, the temporal pulse position is also found to be Gaussian distributed. The term $C_1$, which is a cumbersome function of both the chirp parameter of the injected pulses and of the fiber loss coefficient, is a proportionality coefficient given by:

$$C_1^2 = \frac{2\sqrt{2}}{\sqrt{\pi}} I_1 \quad (2)$$

where $$I_1 = \int_{-z^*}^{L-z^*} dz \int_{-z^*}^{L-z^*} dz' \frac{zf(z+z^*)z'f(z'+z^*)}{(z^2+z'^2)^{3/2}}$$

f(z) is the ratio of the average power at z and the power at the input of the line and L is the link length. The term $z^*$ denotes the portion of the fiber length whose dispersion is pre-compensated for at the transmitter side. The reason for including only two pulse interactions in the averaging that led to equation (1) is that, as shown in the prior art, only cross phase modulation contributes to timing jitter. An analytical expression for $C_1$ can be obtained in the simplified case of a lossless fiber, where $f(z)=1$ so that $C_1^2 = 2\sqrt{2/\pi}[2\sqrt{(L-z^*)^2+z^{*2}} - \sqrt{2}(|L-z^*|+|z^*|)]$. This expression can be used in equation (1) after replacing $P_{av}$ with the path averaged optical power to obtain an order-of-magnitude estimate of the timing jitter. This suggests that the growth of the timing jitter is approximately proportional to the square root of the length of the link. Note the strong dependence of timing jitter on the launched pulse width, which stresses the advantage of using short pulses. Additionally, the dependence on the dispersion coefficient exposes the advantage of high dispersion fibers in this transmission scheme. That is, in order to minimize the timing jitter, the optimum amount of pre-chirp is found by means of minimizing, by variation of $z^*$, the integral $I_1$, which is defined above.

Since timing jitter is generated by cross-phase modulation, which is an incoherent process, equations (1) and (2) hold regardless of the phase relationship between the transmitted pulses. In order to analyze intensity impairments the cases of phase coherence and phase incoherence need to be explicitly separated. The phase coherent case occurs when the pulses originate from a single mode locked laser or from a continuous wave (CW) laser whose intensity is externally modulated. This applies to most cases of electrical time-division multiplexing (ETDM). The phase incoherent case prevails typically when the launched pulse stream originates from more than one source laser as in the case of optical time-division multiplexing (OTDM).

In the case of phase coherence, equally spaced pulses have an equal phase difference between them. The standard deviation of the pulse energy divided by the mean energy of ones, which are referred to as amplitude jitter, is obtained from the following expression:

$$\frac{std(E_1)}{E_1} = C_2 \gamma P_{av} \tau, \quad (3)$$

where $C_2$ is a proportionality coefficient depending only on B, $z^*$ and the fiber parameters and not on the average power $P_{av}$, nor on the pulse width $\tau$. The proportionality coefficient may be obtained as an average over the tranmsitted message of all three pulse interactions yielding a cumbersome expression. An appropriate expression can be obtained in the asymptotic case where $|B_2|LB^2 \gg 1$, yielding $$C_2^2 \cong \frac{8\log(|B_2|LB^2)}{3|B_2|} I_2, \quad (4)$$

where $$I_2 = \int_0^L dz f(z)^2 - \int_{-z^*}^{L-z^*} dz f_w(z+z^*) f_w(-z+z^*)$$

and $f_w(z) = f(z) \text{rect}(z;0,L)$, with $\text{rect}(z;0,L)$ being a function which is 1 for $0 \leq z \leq L$ and zero elsewhere. The approximation leading to equation (4) involves the disregard of the correlation between contributions of different three pulse interactions to amplitude jitter. This disregard is justified by the large number of interacting pulses in this scheme. Similarly to the timing jitter, the amplitude jitter decreases with increasing dispersion or decreasing pulse width. Its dependence on pulse width is, however, more moderate. The approximate expression for $C_2$ allows for optimization of the pre-compensation parameter $z^*$ for the minimization of the amplitude jitter.

That is, in order to minimize the amplitude jitter, the optimum amount of pre-chirp is found by means of minimizing, by variation of z*, the integral $I_2$, which is defined above.

The minimization of these integrals ($I_1$ and $I_2$) can be performed accurately and quickly with standard numerical techniques. Heuristic, simplifying approximations are also available. It is beneficial to use any amount of pre-chirp in a range around the optimum amount. In systems with symmetric power evolutions, the optimum amount of pre-chirp is close to half of the total dispersion in the link. Since, however, it may be shown by numerical evaluations of $I_1$ and $I_2$ that $I_2$ is more sensitive to the amount of pre-chirp and that with the amount of pre-chirp that minimizes $I_2$ the quantity $I_1$ is also very close to its minimum value, the optimization of the link for that concerns both amplitude and timing jitter is performed by using the amount of pre-chirp that minimizes $I_2$.

In the particular case of a link made of n lossy fiber segments of length $z_0$ ($L=nz_0$) and lumped amplification with Erbium amplifiers, the procedure of the present invention can be followed analytically. In this case, $f(z)=\exp[-\alpha \bmod(z,z_0)]$, where $\alpha$ is the fiber loss coefficient and $\mod(z, z_0)$ is the remainder of the division of z by $z_0$, and the minimum value for $C_2$ is obtained for $$z_{opt}^* = \frac{nz_0}{2} - \frac{n(\alpha z_0 - 1) + (n-1)\exp(-\alpha z_0)}{2\alpha[n - (n-1)\exp(-\alpha z_0)]}. \tag{5}$$

For the above expression to be valid, $z_{opt}^* \leq (nz_0)/2$ should be consistently verified that it is large enough and that $\alpha z_0$ is realistic. The point of zero accumulation dispersion $z_{opt}^*$ always precedes the center of the line by less than half a span length. An evaluation of $C_1$, shows that the timing jitter for $z^* = z_{opt}^*$ is also very close to its minimum.

Similarly, the mean energy of the echo pulses appearing in the time slots corresponding to logical zeroes (in the phase coherent case) can be expressed as $$\frac{\text{mean}(E_0)}{E_1} = (C_3 + C_4)\gamma^2 P_{av}^2 \tau^2, \tag{6}$$

where once again the terms $C_3$ and $C_4$ are proportionality coefficients depending only on B, z* and the fiber dispersion parameters. Using the same approximations as in the derivation of (6) in the asymptotic regime $|B_2|LB^2 \gg 1$, $C_3$ and $C_4$ are given by $$C_3 \cong \frac{\pi\sqrt{3}}{12} B^2 \left[\int_0^L dz f(z)\right]^2,$$

$$C_4 \cong \frac{4\log(|B_2|LB^2)}{\sqrt{3}|B_2|} \int_0^L dz f(z)^2.$$

The power of the echo pulses is independent, within the variability of the approximations, of the pre-compensation, z*, whereas both timing and ampitude jitter strongly depend on it.

In the phase incoherent case in which the phase of the transmitted pulses is random, there is a random phase relation between the contribution of the nonlinear interaction and the transmitted pulse at a given time slot. A general relation between the amplitude jitter and the average power of the echo pulses at the position where a logical zero is transmitted is found as follows:

$$\frac{\text{std}(E_1)}{E_1} = \sqrt{\frac{2}{\sqrt{3}}} \left[\frac{\text{mean}(E_0)}{E_1}\right]. \tag{9}$$

Asymptotically, for $|B_2|LB^2 \gg 1$, the energy of the echo pulses is still described by equation (6), only with $C_3=0$, as certain phase sensitive contributions are averaged out. Since $C_3>0$ this implies that the energy of the echo pulses at zeroes is always smaller in the phase incoherent case. To understand the amplitude jitter of ones, equation (6) with $C_3=0$ can be inserted into equation (9) which shows that the amplitude jitter is given exactly by equations (3) and (4), only without the second integral in the square brackets of equation (4). Since the value of this integral is always non-negative the amplitude jitter in the incoherent case is equal to or larger than in the case of phase coherent pulses. Based on the above, the pre-compensation of the signal in the incoherent case has no effect either on the amplitude jitter or on the average energy of zeroes.

Figure 1A:
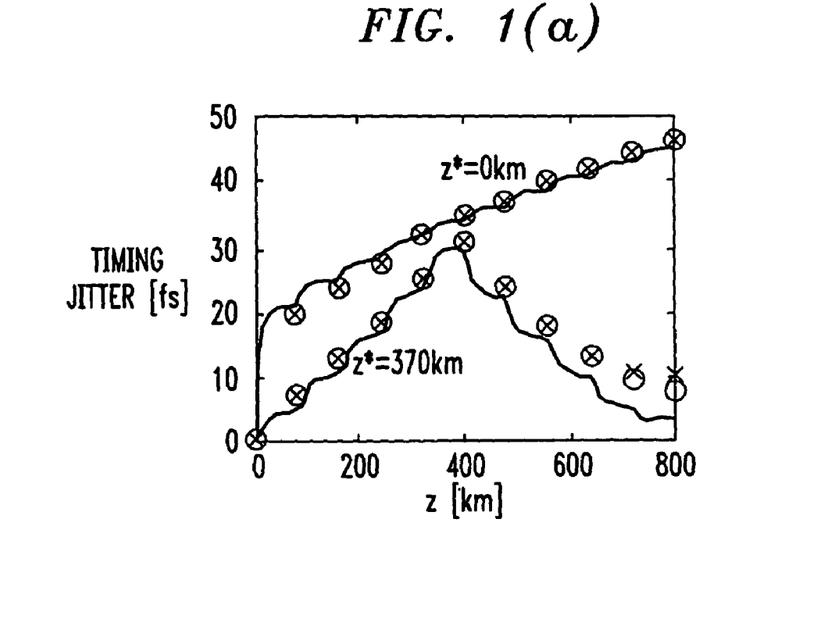
FIG. 1a shows the timing jitter as a function of position along the link with 4 dBm average input power.
Figure 1B:
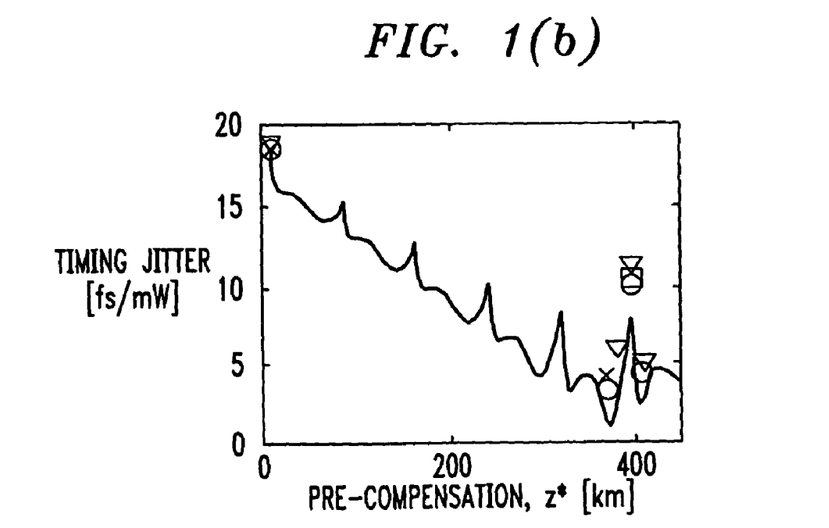
FIG. 1b shows the effect of pre-compensation on timing jitter at the link output for average input powers of 4 dBm, 7 dBm and 10 dBm.
Figure 1C:
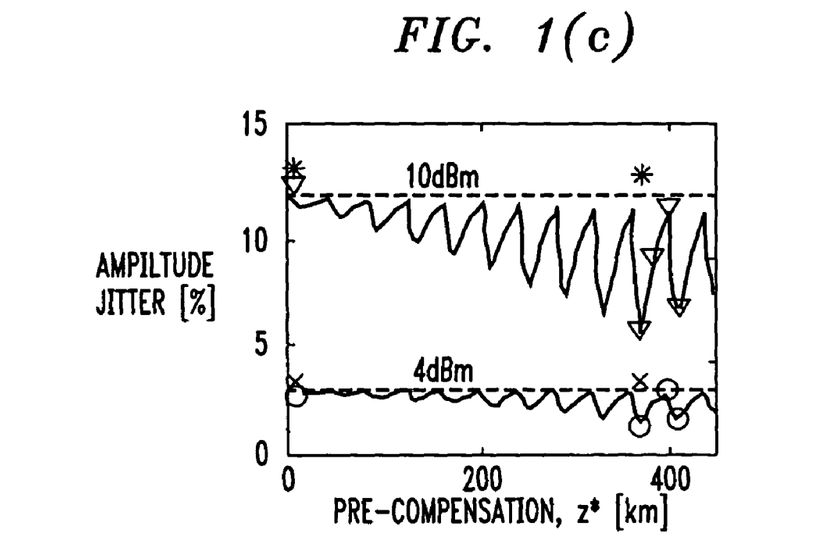
FIG. 1c shows the amplitude jitter at the link output as a function of the pre-compensation parameter with the average input powers of 4 dBm and 7 dBm.
Figure 1D:
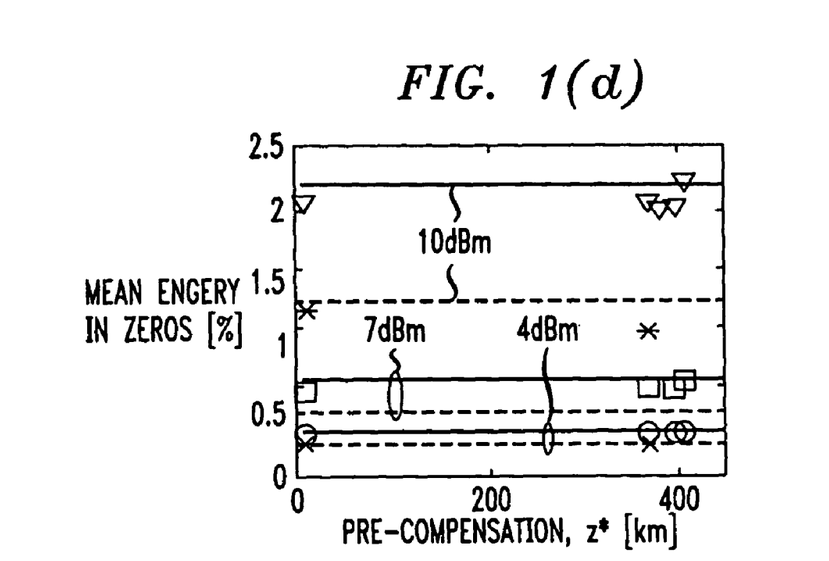
FIG. 1d shows the mean energy in the time slots corresponding to logical zeroes for average input powers of 4 dBm and 7 dBm.

To confirm the theoretical results a comprehensive series of simulations have been performed and are presented herein using a 40 Gb/s Pseudo Random Bit Sequence (PRBS) consisting of 2.5 ps wide Gaussian shaped pulses is injected into 10×80 km spans of standard single mode fiber (SMF) with $B_2=-21.67$ ps$^2$/km, $\gamma=1.2$W$^{-1}$km$^{-1}$ and $\alpha=0.048$ km$^{-1}$. The simulations were performed with a time window equivalent to 2048 symbols. This large time window was necessary, since with the parameters the number of overlapping pulses was as large as 1500. Other simulations using a shorter time frame consisting only of 512 symbols led to deviations on the order of 30% in the computation of the timing jitter. FIG. 1a shows the timing jitter as a function of position along the link with 4 dBm average input power. Both the theoretical expression (1) and the simulation results are displayed for two values of pre-compensation z*=0 and $z^*=z_{opt}^*=370$ km. There is a noticeable large advantage of optimal pre-compensation, leading to a reduction by a factor of 4.55 in the resulting timing jitter. The effect of pre-compensation on timing jitter at the link output is shown in FIG. 1b for average input powers of 4 dBm, 7 dBm and 10 dBm. The results are normalized to the average launched power. The fact that the points obtained with the three powers nearly overlap in the figure confirms the validity of the pertubational approach up to these powers. The amplitude jitter at the link output is shown as a function of the pre-compensation parameter in FIG. 1c with the average input powers of 4 dBm and 7 dBm. The theoretical prediction for $z_{opt}^*$ in the coherent case is in agreement with the simulation results. In the incoherent case there is a larger amplitude jitter and its value is practically independent of the pre-compensation parameter. The mean energy in the time slots corresponding to logical zeroes for average input powers of 4 dBm and 7 dBm is plotted in FIG. 1d. Its dependence on the value of pre-compensation is negligible as expected, and its value is smaller in the incoherent case.

The effect of pre-dispersion, which is at the root of the present invention, is most clearly observed and understood when the power profile along the fiber is symmetric about the center of the link. This symmetry can be obtained, at least approximately, by introducing Raman amplification with a counter-propagating pump (or pumps). In such cases both the timing and amplitude jitter can be canceled out by equally splitting the dispersion compensation between the input and output of the optical link, as it can be shown that both $I_1$, and $I_2$ are zero for $z^*=z_{opt}^*=L/2$. It has been shown that the present invention, however, permits optimization of the amount of predispersion to yield a significant reduction of the transmission penalties in more realistic cases when the power profile is not perfectly symmetric.

Figure 2:
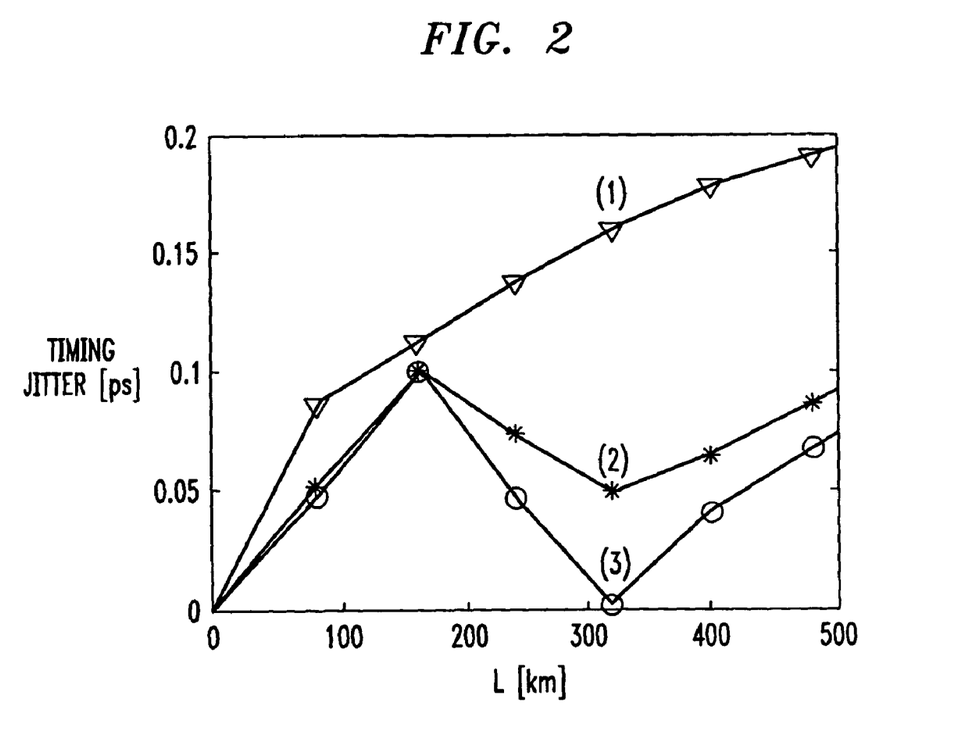
FIG. 2 (top) illustrates timing jitter versus link length and (bottom) shows eye diagrams captured at points marked in the top of the figure.

To demonstrate this effect FIG. 2 shows three different sets of simulations, where we used 4 ps pulses with an average power of 7 dBm. In the top figure only the timing jitter is plotted against the link length. The amplitude jitter has a similar evolution. The triangles show the timing jitter in a lossy link with Raman amplified fiber spans of 80 km, and without pre-dispersion. The Raman pump power was chosen such that the fiber losses were compensated in each span. The asterisks show the timing jitter for the same link, but where the pulses are pre-dispersed by −2720 ps/nm. In this case, the pulses are transform-limited at 160 km where the penalties are maximal and after 320 km the penalties are minimized. The circles demonstrate the exact cancellation of the timing jitter in a lossless fiber link and after pre-dispersion by 2720 ps/nm. The power in the lossless case was set to the average power in the Raman amplified cases.

In the three cases eye-diagrams have been detected at 320 km. These are indicated in FIG. 2 (at points marked 1–3). It is clear that the penalties are eliminated in the ideal lossless case and that the penalties in the Raman amplified link are reduced because of the pre-dispersion.

The simulations presented in FIG. 2 herein assumed a single Raman pump. Multiple pumps can, in principle, further improve the symmetry of the link so that better cancellation of the penalties can be expected. Note the similarity with the cancellation of the impairments due to optical nonlineadties obtained by mid-span spectral inversion. Both require a symmetric power profile. It is, however, surprising that in the present case this result is obtained only by a proper dispersion management of the link.

Analytical formulae, simulations and a method for overcoming timing and amplitude jitter in systems based on ultra short pulse transmission have been presented. Additionally, it has been shown that the system penalties reduce monotonically with increasing fiber dispersion as well as with decreasing pulse width. Further, it has been shown that the combination of counterpropagating Raman amplification and proper predispersion of the optical pulses enables a significant reduction of the impairments. The method works equally well without Raman amplifier, permitting the reduction of timing and amplitude jitter also when lumped amplification with Erbium amplifiers is used.

In summary, nonlinear impairments due to intrachannel interactions in schemes involving ultrashort pulse (tedon) transmission with random bit sequences have been studied. The amount of timing jitter, amplitude jitter of logical ones and the mean noise on the level of logical zeroes have been presented. The analysis shows the advantage of using short pulse widths and fibers with large chromatic dispersion. It has been further shown that optimal pre-compensation allows significant reduction of timing and amplitude jitter in phase coherent cases.

Figure 3:
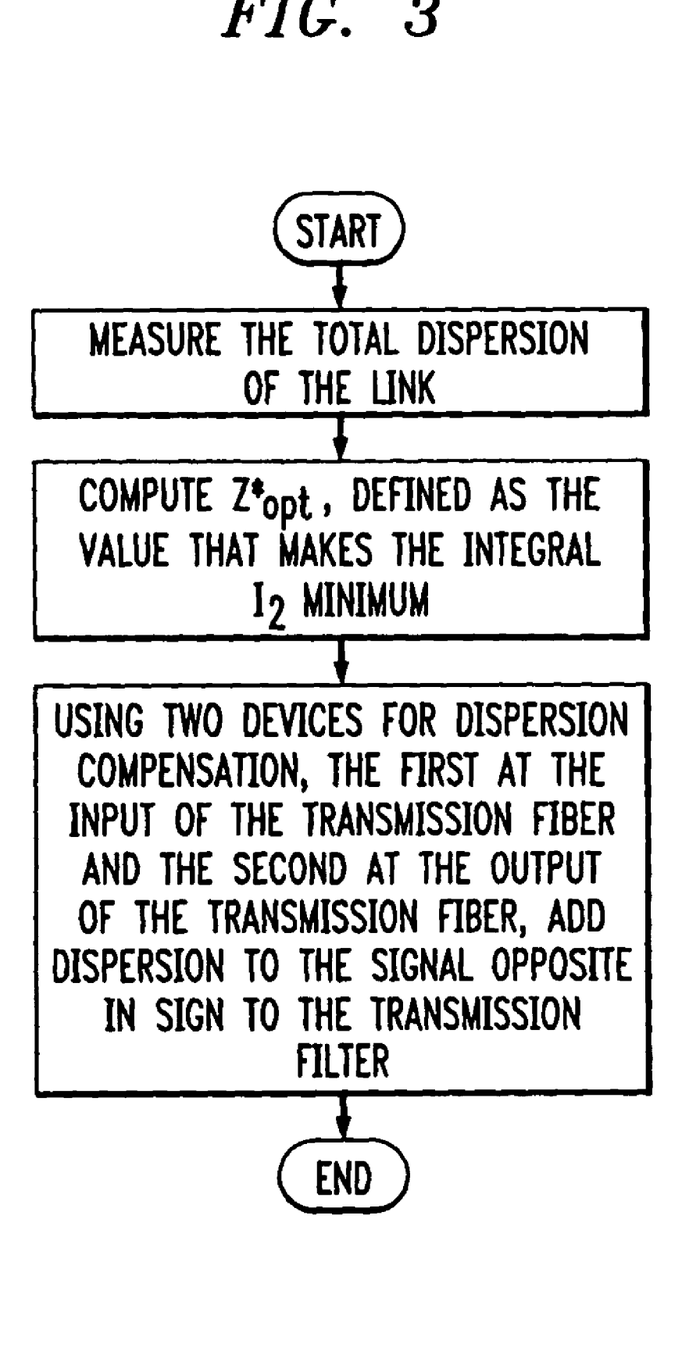
FIG. 3 is a simple flowchart of the steps to reduce timing and amplitude jitter.

FIG. 3 is a simple flowchart of the steps to follow to reduce or eliminate timing and amplitude jitter. Means for measuring total dispersion of a transmission fiber link and are known in the art. Computing devices including processors and system as well as Application Specific Integrated Circuits (ASICs), Field programmbale Gate Arrays (FPGAs), Reduced Instruction Set Computers (RISCs), or any combination thereof or any similar device designed for performing the computations specified herein, can be used to implement the computation of the optimal pre-chirp and therefore, provides a means for performing the computation. The specified computation of optimal pre-chirp may even be computed using a high-end pocket calculator or computer. Two devices are used, one at the input of the transmission fiber and the other at the output of the transmission fiber. Dispersion is added to the signal opposite in sign to the dispersion of the transmission fiber. The two devices may be fibers, gratings or any other device used for this purpose. The two devices for dispersion compensation should, however, be designed such that the device at the input adds dispersion $-z_{opt}^*B_2$ and the device at the output adds $-(1-z_{opt}^*)B_2$, where $B_2$ is the total dispersion of the link.

Figure 4:
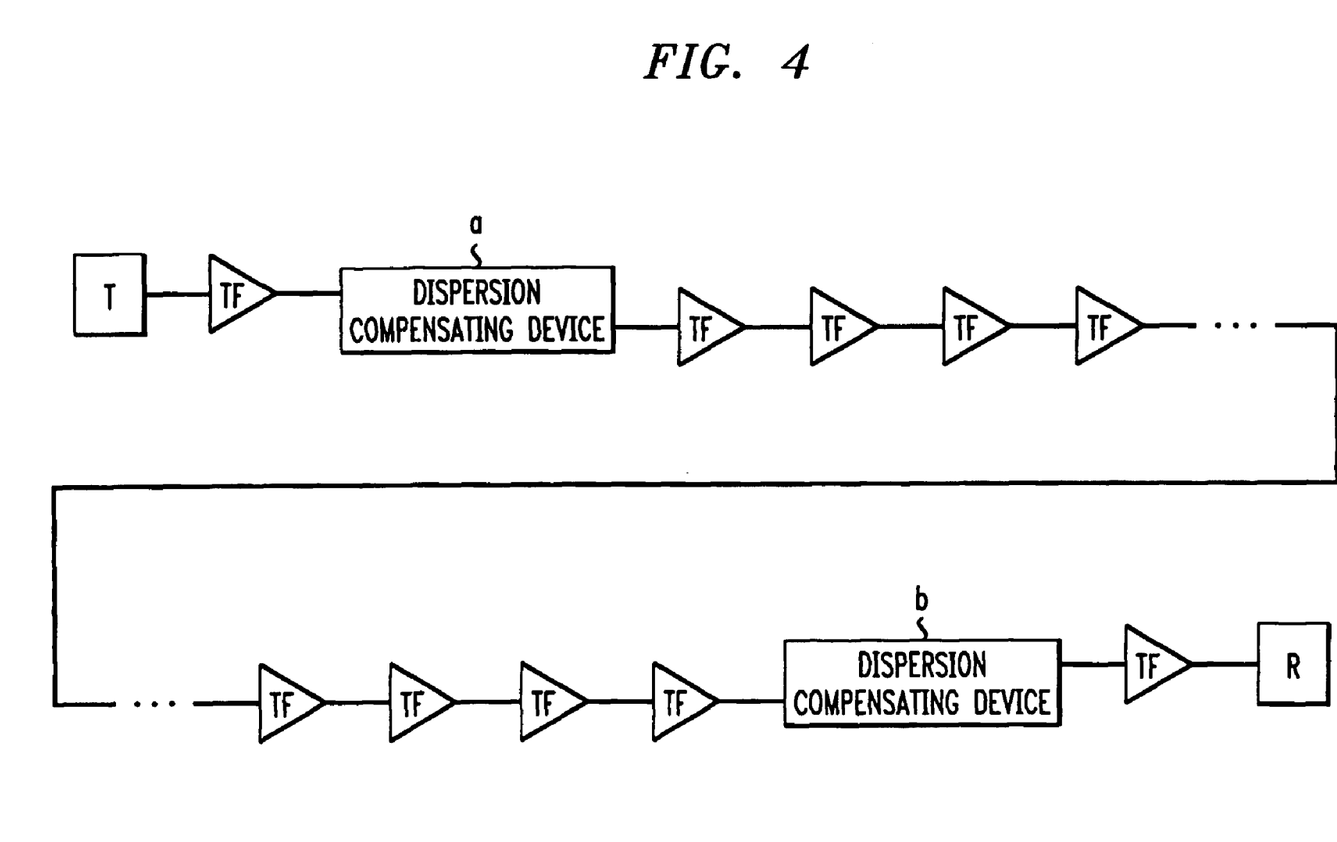
FIG. 4 is a simple block diagram of an exemplary implementation of a system for reducing or eliminating timing and amplitude jitter.

FIG. 4 represents a simple block diagram of an exemplary implementation of a system to reduce or eliminate timing and amplitude jitter. The box to the far left with a "T" represent a transmitter. The trnasmission fiber, which may have a plurality of in-line amplifiers, is represent by the letters "TF". The box to the far right with the letter "R" represents the receiver. The dispersion compensation devices are represented by "(a)" and "(b)", with "(a)" being the dispersion compensation device at the input of the transmission fiber and with "(b)" being the dispersion compensating device at the output of the transmission fiber. The amounts of dispersion to be added to the input and the output of the tranmission fiber is as specified above in the description of FIG. 3.

The present invention may be implemented in hardware, software or firmware as well as Application Specific Integrated Circuits (ASICs) or Field Programmable Gate Arrays (FPGAs) or any other menas by which the functions and process disclosed herein can be effectively and efficiently accomplished or any combination thereof. The above means for implementation should not be taken to be exhaustive but merely exemplary and therefore, not limit the means by which the present invention may be practiced.

It should be clear from the foregoing that the objectives of the invention have been met. While particular embodiments of the present invention have been described and illustrated, it should be noted that the invention is not limited thereto since modifications may be made by persons skilled in the art. The present application contemplates any and all modifications within the spirit and scope of the underlying invention disclosed and claimed herein.

What is claimed is:

1. A method for reducing timing jitter in transmission of Return-to-Zero modulated pulses comprising the steps of:
    measuring a total dispersion of a transmission fiber link;
    computing an optimal amount of pre-chirp to be added at an input of said transmission fiber link, wherein the optimal amount of pre-chirp to be added to the input of the transmission fiber is a function of the total dispersion of said transmission fiber link and a portion of fiber length having dispersion precompensated for at a transmitter side of the transmission fiber link;
    computing an optimal amount of pre-chirp to be added at an output of said transmission fiber link, wherein the optimal amount of pre-chirp to be added to the output of the transmission fiber is a function of the total dispersion of said transmission fiber link and a portion of fiber length having dispersion precompensated for at the transmitter side;
    adding said optimal amount of pre-chirp to said input of said transmission fiber link; and adding said optimal amount of pre-chirp to said output of said transmission fiber link.

2. A method for reducing amplitude jitter in transmission of Return-to-Zero modulated phase coherent pulses comprising the steps of:
   measuring a total dispersion of a transmission fiber link;
   computing an optimal amount of pre-chirp to be added at an input of said transmission fiber link, wherein said optimal amount of pre-chirp is obtained by minimizing amplitude jitter by variation of z*, a portion of fiber length having dispersion pre-compensated for at a transmitter side of the transmission fiber link;
   computing an optimal amount of pre-chirp to be added at an output of said transmission fiber link;
   adding said optimal amount of pre-chirp to said input of said transmission fiber link; and
   adding said optimal amount of pre-chirp to said output of said transmission fiber link.

3. The method according to claim 2, wherein said optimal amount of pre-chirp is obtained by determining the minimum of $I_2$, where $$I_2 = \int_0^L dz f(z)^2 - \int_{-z^*}^{L-z^*} dz f_w(z+z^*) f_w(-z+z^*).$$

4. A system for reducing timing jitter in transmission of Return-to-Zero modulated pulses comprising:
   means for measuring a total dispersion of a transmission fiber link;
   means for computing an optimal amount of pre-chirp to be added at an input of said transmission fiber link, wherein the optimal amount of pre-chirp to be added to the input of the transmission fiber is a function of the total dispersion of said transmission fiber link and a portion of fiber length having dispersion precompensated for at a transmitter side of the transmission fiber link;
   means for computing an optimal amount of pre-chirp to be added at an output of said transmission fiber link, wherein the optimal amount of pre-chirp to be added to the input of the transmission fiber is a function of the total dispersion of said transmission fiber link and a portion of fiber length having dispersion precompensated for at the transmitter side;
   means for adding said optimal amount of pre-chirp to said input of said transmission fiber link; and
   means for adding said optimal amount of pre-chirp to said output of said transmission fiber link.

5. A system for reducing timing jitter in transmission of Return-to-Zero modulated pulses comprising:
   means for measuring a total dispersion of a transmission fiber link;
   means for computing an optimal amount of pre-chirp to be added at an input of said transmission fiber link, wherein the optimal amount of pre-chirp to be added to the input of the transmission fiber is a function of the total dispersion of said transmission fiber link and a portion of fiber length having dispersion precompensated for at a transmitter side of the transmission fiber link;
   means for computing an optimal amount of pre-chirp to be added at an output of said transmission fiber link, wherein the optimal amount of pre-chirp to be added to the input of the transmission fiber is a function of the total dispersion of said transmission fiber link and a portion of fiber length having dispersion precompensated for at the transmitter side;
   a dispersion compensating device for adding said optimal amount of pre-chirp to said input of said transmission fiber link; and
   a dispersion compensating device for adding said optimal amount of pre-chirp to said output of said transmission fiber link.

6. A system for reducing timing jitter in transmission of Return-to-Zero modulated pulses comprising:
   a device for measuring a total dispersion of a transmission fiber link;
   a computing device for calculating an optimal amount of pre-chirp to be added at an input of said transmission fiber link, wherein the optimal amount of pre-chirp to be added to the input of the transmission fiber is a function of the total dispersion of said transmission fiber link and a portion of fiber length having dispersion precompensated for at a transmitter side of the transmission fiber link;
   a computing device for calculating an optimal amount of pre-chirp to be added at an output of said transmission fiber link, wherein the optimal amount of pre-chirp to be added to the input of the transmission fiber is a function of the total dispersion of said transmission fiber link and a portion of fiber length having dispersion precompensated for at the transmitter side;
   a dispersion compensating device for adding said optimal amount of pre-chirp to said input of said transmission fiber link; and
   a dispersion compensating device for adding said optimal amount of pre-chirp to said output of said transmission fiber link.

* * * * *